(12) United States Patent
Hwang

(10) Patent No.: US 12,454,772 B2
(45) Date of Patent: *Oct. 28, 2025

(54) SUB-MICRON FIBROUS MEMBRANE AND METHOD FOR PRODUCING SAME

(71) Applicant: IDKLAB INC., Daejeon (KR)

(72) Inventor: Wontae Hwang, Daejeon (KR)

(73) Assignee: IDKLAB INC., Daejeon (KR)

( * ) Notice: Subject to any disclaimer, the term of this patent is extended or adjusted under 35 U.S.C. 154(b) by 482 days.

This patent is subject to a terminal disclaimer.

(21) Appl. No.: 17/913,644

(22) PCT Filed: Mar. 23, 2021

(86) PCT No.: PCT/KR2021/003548
§ 371 (c)(1),
(2) Date: Sep. 22, 2022

(87) PCT Pub. No.: WO2021/206317
PCT Pub. Date: Oct. 14, 2021

(65) Prior Publication Data
US 2023/0100934 A1     Mar. 30, 2023

(30) Foreign Application Priority Data

Apr. 7, 2020   (KR) ........................ 10-2020-0042198

(51) Int. Cl.
*D01D 5/00*   (2006.01)
*A41D 13/11*  (2006.01)
(Continued)

(52) U.S. Cl.
CPC ........... *D01D 5/0007* (2013.01); *A41D 13/11* (2013.01); *B01D 39/1623* (2013.01); *B01D 46/543* (2013.01); *D04H 1/43* (2013.01); *D04H 1/43835* (2020.05); *D04H 1/43838* (2020.05); *D04H 1/728* (2013.01); *A62B 23/025* (2013.01); *B01D 2239/0631* (2013.01); *B01D 2239/064* (2013.01); *B01D 2239/10* (2013.01); *B01D 2239/1233* (2013.01); *D10B 2505/04* (2013.01)

(58) Field of Classification Search
None
See application file for complete search history.

(56) References Cited

U.S. PATENT DOCUMENTS

| | | | |
|---|---|---|---|
| 2009/0326128 A1 | 12/2009 | MacOssay-Torres | |
| 2010/0009267 A1* | 1/2010 | Chase | D01D 5/0038 204/192.12 |

(Continued)

FOREIGN PATENT DOCUMENTS

| | | | | |
|---|---|---|---|---|
| CN | 106811847 A | * | 6/2017 | ............... D01F 9/22 |
| KR | 101821049 B1 | | 1/2018 | |

(Continued)

OTHER PUBLICATIONS

CN106811847A_Eng (Espacenet machine translation of Yang) (Year: 2017).*

*Primary Examiner* — Gabriel E Gitman
(74) *Attorney, Agent, or Firm* — Verrill Dana, LLP

(57) ABSTRACT

Provided are a sub-micron fibrous membrane in which sub-micron fibers aligned along one axis and sub-micron fibers in a random pattern form a network, and a method for producing the sub-micron fibrous membrane.

19 Claims, 22 Drawing Sheets

(51) Int. Cl.
*B01D 39/16* (2006.01)
*B01D 46/54* (2006.01)
*D04H 1/43* (2012.01)
*D04H 1/4382* (2012.01)
*D04H 1/728* (2012.01)
A62B 23/02 (2006.01)

(56) References Cited

U.S. PATENT DOCUMENTS

2010/0317790 A1 12/2010 Jang et al.
2021/0198809 A1* 7/2021 Solberg ................ D01D 5/0061

FOREIGN PATENT DOCUMENTS

| | | |
|---|---|---|
| KR | 1020180079273 A | 7/2018 |
| KR | 1020200027342 A | 3/2020 |

* cited by examiner

Filter efficiency after washing with ethanol
90% efficiency was maintained after washing 20 times Sampling of filter for bending test FIG.21
After bending test was performed 1,000 times
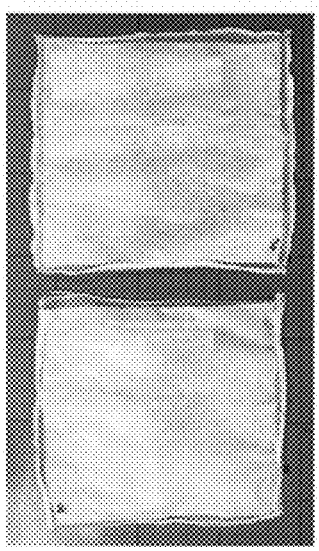
After bending test was performed 2,000 times
- Microstructure of nanofiber filter (before bending test)
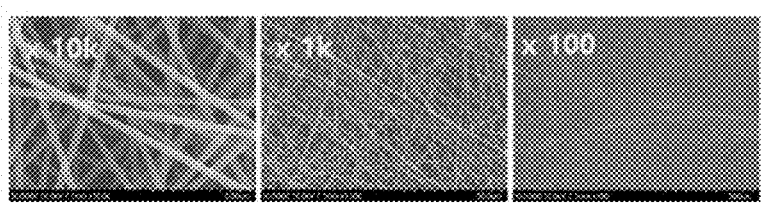
- Microstructure of nanofiber filter (bent 2,000 times)
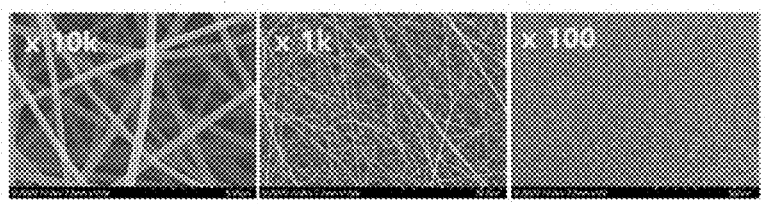

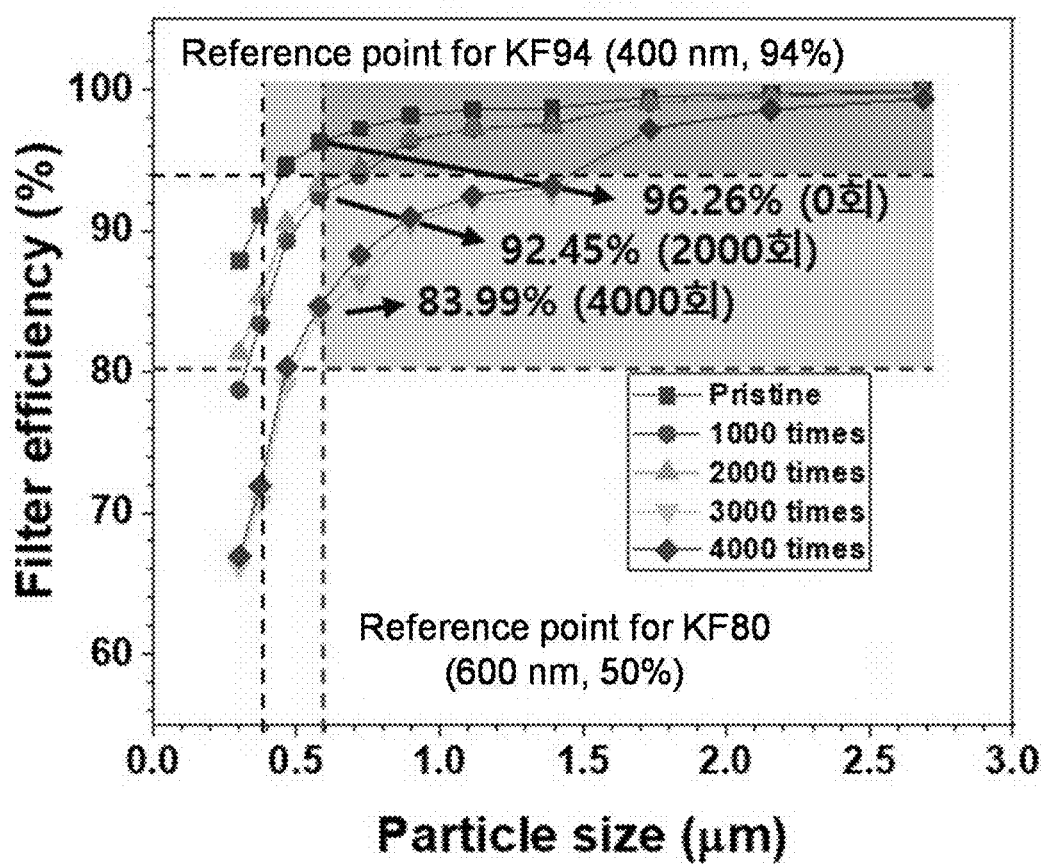

SUB-MICRON FIBROUS MEMBRANE AND METHOD FOR PRODUCING SAME

TECHNICAL FIELD

The present disclosure relates to a sub-micron fibrous membrane and a method for producing the same.

BACKGROUND ART

Methods of manufacturing sub-micron fibers include drawing, template synthesis, phase separation, self-assembly, electrospinning, and the like. Among these methods, electrospinning is generally used to continuously fabricate sub-micron fibers.

Electrospinning is a method that applies high voltage between a nozzle for spinning a spinning solution and a stage where a substrate is placed to form a higher electric field than the surface tension of the spinning solution and spin the spinning solution into sub-micron fibers. Sub-micron fibers fabricated by electrospinning are affected by the physical properties of the spinning solution—such as viscosity, elasticity, conductivity, dielectric property, and surface tension—the intensity of the electric field, the distance between the nozzle and an integrated electrode, and so on.

In this instance, there is a conventional technique for aligning sub-micron fibers in one direction by changing an electric field using an insulating block in an electrospinning process. In such a conventional technique, sub-micron fibrous membranes can be fabricated which are aligned in a grid by moving and rotating a lower substrate. These sub-micron fibrous membranes may be used in bio applications or in fine dust filters.

However, this conventional technique has limitations in the mass production of sub-micron fibrous membranes since the lower substrate is moved and/or rotated while an electrospinning solution is spun using a single nozzle.

DISCLOSURE

Technical Problem

An aspect of the present disclosure provides a sub-micron fibrous membrane in which sub-micron fibers aligned along one axis and sub-micron fibers in a random pattern form a network, and a method for producing the sub-micron fibrous membrane.

Technical Solution

An embodiment of the present disclosure provides a sub-micron fibrous membrane including: a plurality of first sub-micron fibers spun in alignment along one axis; and a plurality of second sub-micron fibers spun in a random pattern to form a network with the plurality of first sub-micron fibers.

According to one aspect, the diameter of the plurality of first sub-micron fibers may be larger than the diameter of the plurality of second sub-micron fibers.

According to another aspect, the diameter of the plurality of first sub-micron fibers may be included in the range of 300 nm to 2 µm, and the diameter of the plurality of second sub-micron fibers may be included in the range of 50 nm to 300 nm.

According to still another aspect, the size of a space formed inside the sub-micron fibrous membrane may be adjusted by adjusting a difference between the diameter of the plurality of first sub-micron fibers and the diameter of the plurality of second sub-micron fibers.

According to a further aspect, a polymer material forming the plurality of first sub-micron fibers and a polymer material forming the plurality of second sub-micron fibers may be different.

According to a further aspect, a polymer forming the plurality of first sub-micron fibers and the plurality of second sub-micron fibers may include one or a combination of the following polymers: polyacrylonitrile, polyvinylidene fluoride-hexafluoropropylene (PVDF-HFP), polymethylmethacrylate (PMMA), polyurethane, polysulfones (polysulfone, polyethersulfone, and polyphenylene sulfone), polyvinyl acetate (PVAc), polyacrylic acid (PAA), polyvinyl alcohol (PVA), polyvinylidene fluoride (PVDF), polyimide (PI), and polystyrene (PS).

According to a further aspect, a polymer forming the plurality of first sub-micron fibers may include one or a combination of the following polymers: polyacrylonitrile, polyvinylidene fluoride-hexafluoropropylene (PVDF-HFP), polymethylmethacrylate (PMMA), polyurethane, polysulfones (polysulfone, polyethersulfone, and polyphenylene sulfone), polyvinyl acetate (PVAc), polyacrylic acid (PAA), polyvinyl alcohol (PVA), polyvinylidene fluoride (PVDF), polyimide (PI), and polystyrene (PS), and a polymer forming the plurality of second sub-micron fibers includes one biodegradable polymer or a combination of two or more biodegradable polymers of the following: polylactic acid (PLA), poly(lactic-co-glycolic acid) (PLGA), and chitosan.

According to a further aspect, the plurality of first sub-micron fibers may be formed through a plurality of first electrospinning portions to which a first voltage is applied, for aligning and spinning sub-micron fibers in a first horizontal direction, and the plurality of second sub-micron fibers may be formed through a plurality of second electrospinning portions to which the first voltage is applied, for randomly spinning sub-micron fibers.

According to a further aspect, the plurality of first electrospinning portions each may be disposed by forming m first columns including n first spinning nozzles, the plurality of second electrospinning portions each may be disposed by forming i second columns including j second spinning nozzles, and at least one of the i second columns may be disposed between at least two of the m first columns, wherein n, m, j, and i are natural numbers.

According to a further aspect, the plurality of first sub-micron fibers may be spun in alignment along one axis by a force exerted in the first horizontal direction, which is generated by a guide portion included in each of the plurality of first electrospinning portions, wherein the guide portion generates a force exerted on sub-micron fibers spun from a first spinning nozzle in the first horizontal direction by changing an electric field formed between the first spinning nozzle which spin sub-micron fibers from a spinning solution and a stage portion to which a second voltage different than the first voltage is applied.

According to a further aspect, the guide portion may include a first guide body and a second guide body which are spaced apart from each other in the second horizontal direction perpendicular to the first horizontal direction, and the first spinning nozzle may be disposed under a space between the first guide body and the second guide body.

Another embodiment of the present disclosure provides a mask with the above sub-micron fibrous membrane included in a filter.

A still another embodiment of the present disclosure provides a method for producing a sub-micron fibrous membrane, the method including: forming a plurality of first sub-micron fibers aligned along one axis by continuously electrospinning a polymer solution through a plurality of first electrospinning portions: forming a plurality of second sub-micron fibers in a random pattern by continuously electrospinning the polymer solution through a plurality of second electrospinning portions; and coating a carrier with a network of the plurality of first sub-micron fibers and the plurality of second sub-micron fibers by continuously passing the carrier through an area where the plurality of first sub-micron fibers and the plurality of second sub-micron fibers are formed, while the first electrospinning portions and the second electrospinning portions are continuously electrospinning the polymer solution.

Advantageous Effects

It is possible to mass-produce a sub-micron fibrous membrane by simultaneously spinning sub-micron fibers aligned along one axis on a carrier being transferred and sub-micron fibers that are randomly spun.

Furthermore, a mask using a sub-micron fibrous membrane as a filter lets air through easily and allows the user to breathe more comfortably, since the size of a space formed inside a produced sub-micron fibrous membrane is adjusted by adjusting a difference between the diameter of sub-micron fibers spun in alignment along one axis and the diameter of randomly spun sub-micron fibers.

Furthermore, the use of biodegradable polymers can reduce environmental contamination.

DESCRIPTION OF DRAWINGS

The accompanying drawings included as part of the detailed description in order to help understanding of the present disclosure provide embodiments of the present disclosure, and describe the technical spirit of the present disclosure along with the detailed description.

FIG. 21 shows result images of a bending test conducted on an air filter according to one embodiment of the present.

FIG. 22 is a graph showing the efficiency of an air filter according to one embodiment of the present disclosure.

BEST MODE

Since the present disclosure make various modifications and have several embodiments, particular embodiments will be described in detail below with reference to the accompanying drawings.

In describing the present disclosure, detailed descriptions of related well-known technologies will be omitted to avoid unnecessary obscuring the present disclosure.

It will be understood that, although the terms first, second, etc. may be used herein to describe various elements, these elements should not be limited by these terms. These terms are only used to distinguish one element from another.

FIGS. 1 to 5 are views for explaining a concept of electrospinning of an electrospinning alignment apparatus according to one embodiment of the present disclosure.

Figure 1:
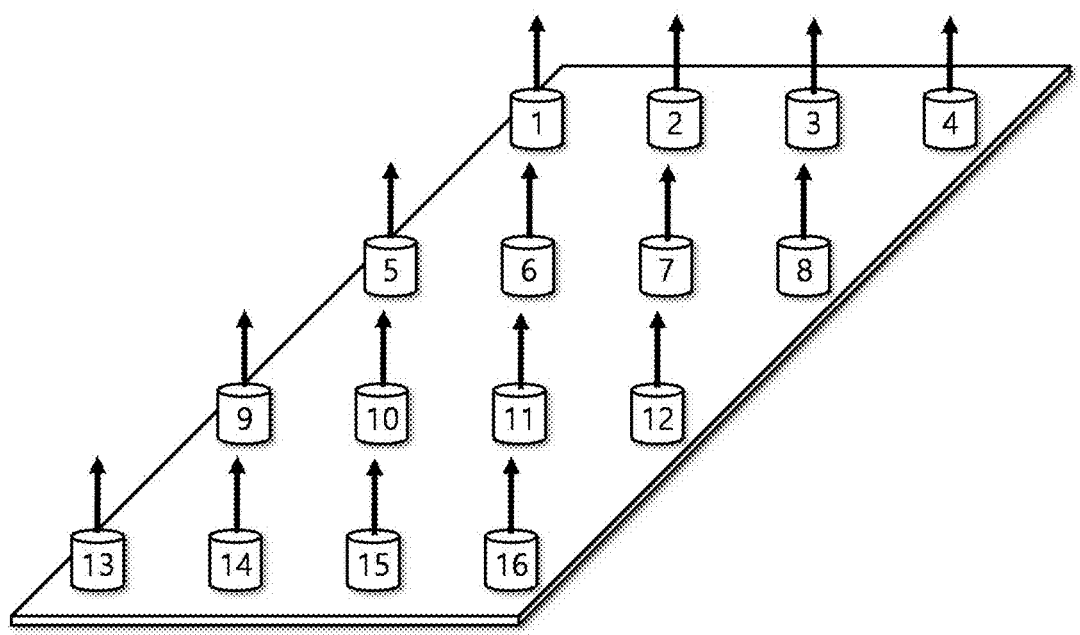
FIGS. 1 to 5 are views for explaining a concept of electrospinning of an electrospinning alignment apparatus according to one embodiment of the present disclosure.

First, FIG. 1 schematically shows a plurality of spinning nozzles 1 through 16 which spins sub-micron fibers from a spinning solution. The arrows respectively corresponding to the plurality of spinning nozzles 1 to 16 indicate respective directions in which the plurality of spinning nozzles 1 to 16 spin sub-micron fibers. Although FIG. 1 depicts an example in which a plurality of spinning nozzles 1 to 16 form four columns and four rows and spin sub-micron fibers upward, the number of spinning nozzles, the number of columns, the number of rows, the directions in which sub-micron fibers are spun, and so on may be various adjusted as will be described below.

Figure 2:
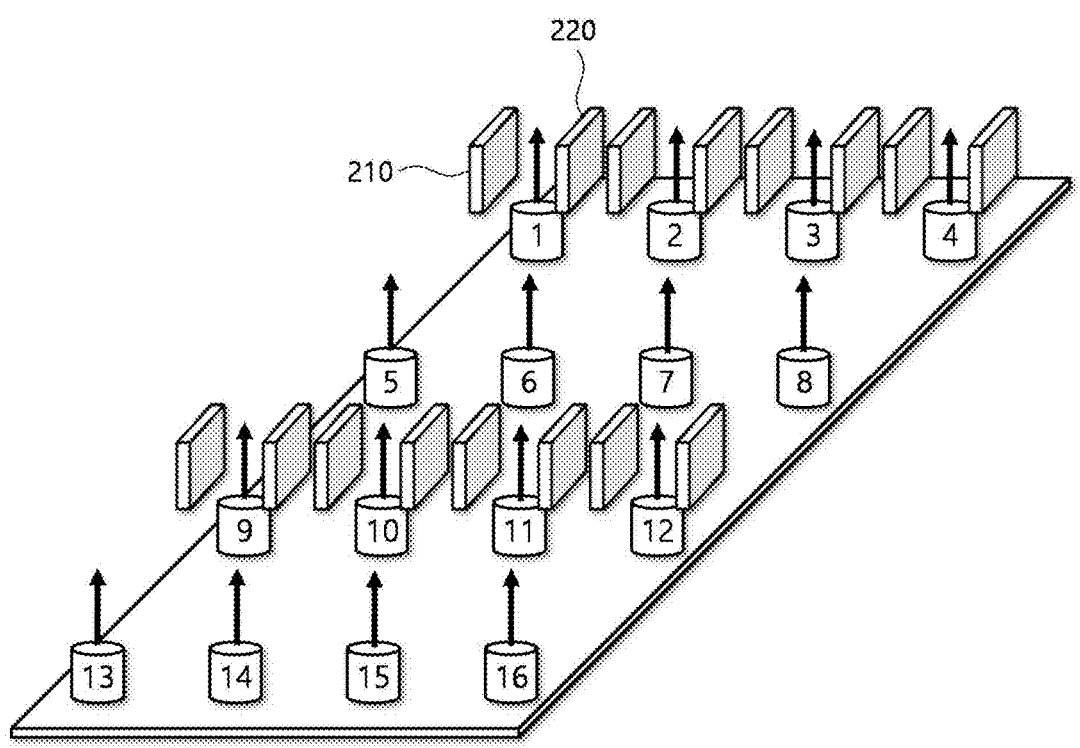

FIG. 2 depicts an example in which guide portions are formed at spinning nozzles 1 to 4 in a first row and spinning nozzles 9 to 12 in a third row. For example, a first guide body 210 and a second guide body 220 may be formed over the spinning nozzle 1 in the first row and the first column, spaced apart from each other. In this case, the first guide body 210 and the second guide body 220 may be disposed in such a way that sub-micron fibers spun from the spinning nozzle 1 in the first row and the first column pass between the first guide body 210 and the second guide body 220, along a direction in which the spinning nozzles 1 to 4 in the first row are spaced out. The first guide body 210 and the second guide body 220 each individually may be formed of a material having a dielectric constant of 50 or lower. In other words, the guide portions formed at the spinning nozzles 1 to 4 in the first row and the spinning nozzles 9 to 12 in the third row may exert a force in a certain direction on the sub-micron fibers spun from the spinning nozzles 1 through 4 in the first row and the spinning nozzles 9 to 12 in the third row, by changing an electric field formed between the spinning nozzles and a stage portion to be described later. For example, a force may be exerted on the sub-micron fibers spun from the spinning nozzle 1 in the first row and the first column, in a direction (hereinafter, "first horizontal direction") horizontally perpendicular to the direction in which the first guide body 210 and the second guide body 220 are arranged.

Figure 3:
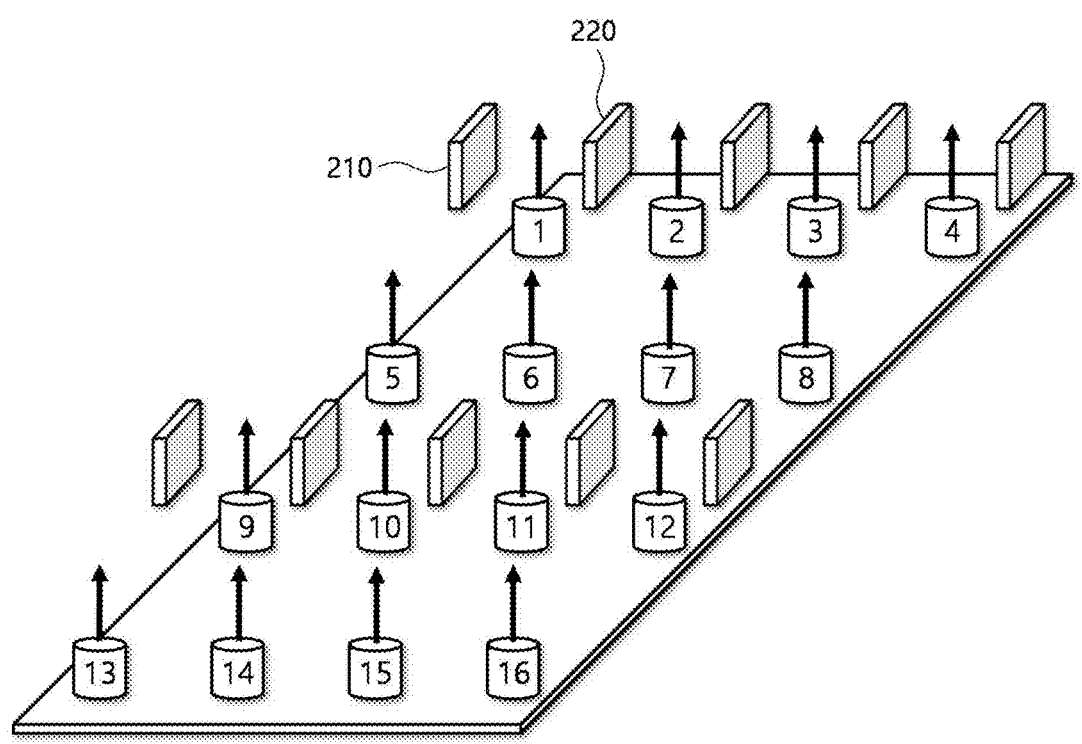

In some embodiments, guide bodies included in a guide portion may be shared between neighboring spinning nozzles. FIG. 3 depicts an example in which guide bodies are shared between neighboring spinning nozzles. More specifically, out of the first guide body 210 and second guide body 220 for the spinning nozzle 1 in the first row and the first column, the second guide body 220 may be shared with the spinning nozzle 2 in the first row and the second column.

In this case, as in FIGS. 2 and 3, sub-micron fibers spun from the spinning nozzles 1 to 4 in the first row and the spinning nozzles 9 to 12 in the third row may be aligned in the first horizontal direction by guide portions, and sub-micron fibers spun from the spinning nozzles 5 to 8 in the second row and the spinning nozzles 13 to 16 in the fourth row may be randomly spun.

Figure 4:
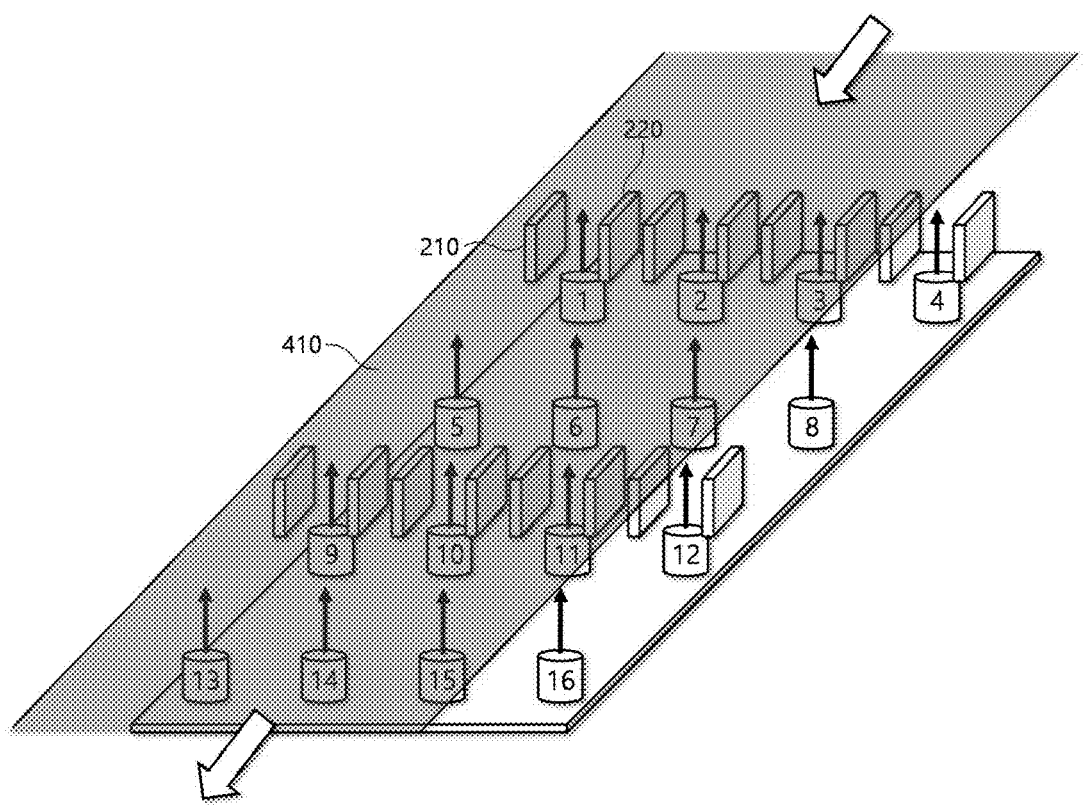

FIG. 4 depicts an example in which a carrier 410 is transferred in the first horizontal direction over the plurality of spinning nozzles 1 to 16 to be explained with reference to FIG. 2. In this instance, the sub-micron fibers spun from the spinning nozzles 1 to 4 in the first row and the spinning nozzles 9 to 12 in the third row may be coated onto the carrier 410 in the first horizontal direction, and the sub-micron fibers spun from the spinning nozzles 5 to 8 in the second row and the spinning nozzles 13 to 16 in the fourth row may be randomly coated onto the carrier 410. The carrier 410 may include a non-woven fabric, for example. For example, a filter having the form of a non-woven fabric, a sub-micron fibrous membrane, and a non-woven fabric may be employed in the manufacture of a mask.

Figure 5:
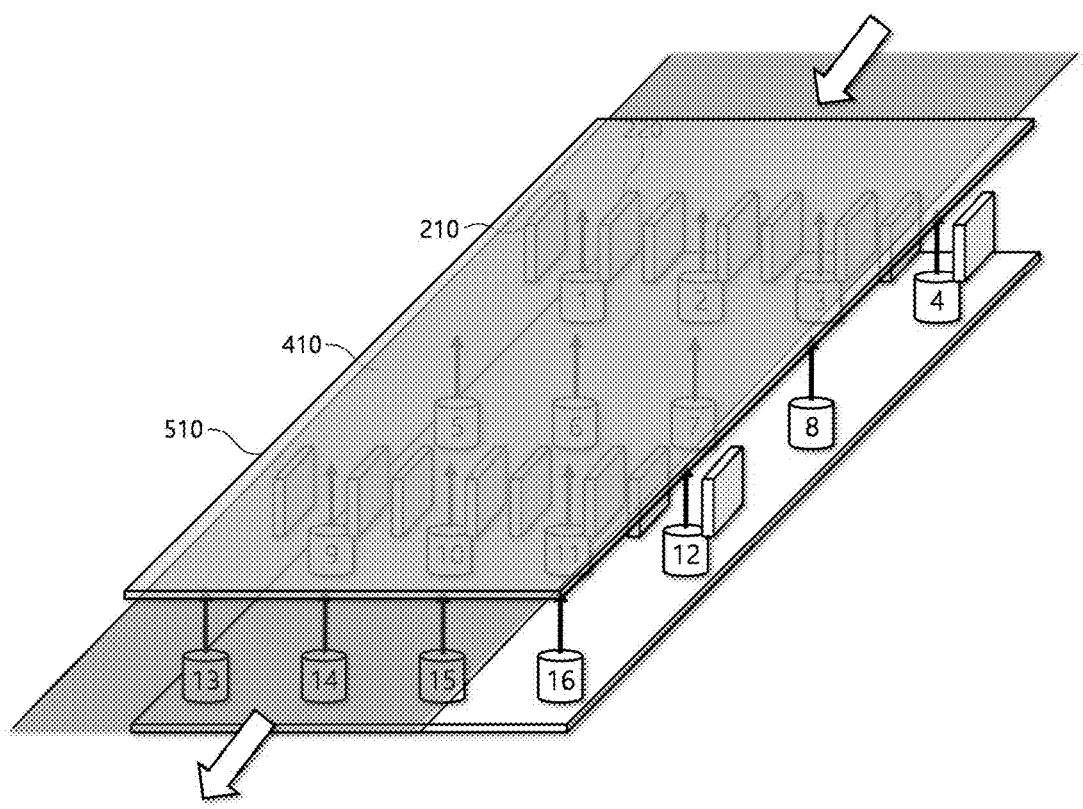

Meanwhile, although omitted in FIGS. 1 to 4, a stage portion 510 may be formed over the plurality of spinning nozzles 1 to 16, as shown in FIG. 5, in order to have electrospinning done. For example, a first voltage may be applied to each of the plurality of spinning nozzles 1 to 16, and a second voltage different from the first voltage may be applied to the stage portion 510. By the application of the first voltage and the second voltage, a spinning solution injected into the plurality of spinning nozzles 1 to 16 may be electrically spun, and an electric field may be formed between the plurality of spinning nozzles 1 to 16 and the stage portion 510. In this instance, the guide portions may change this electric field so that a first horizontal force is exerted on the sub-micron fibers.

Figure 6:
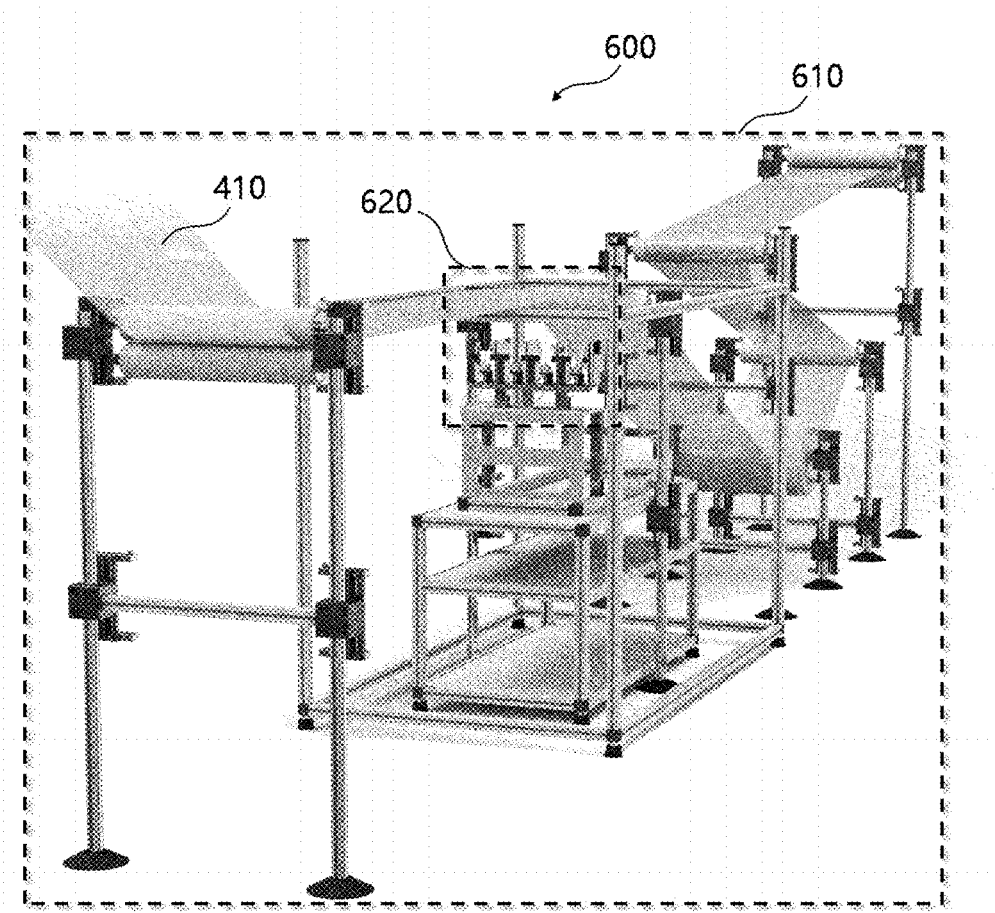
FIGS. 6 and 7 are views illustrating an example of an electrospinning alignment apparatus according to one embodiment of the present disclosure.
Figure 7:
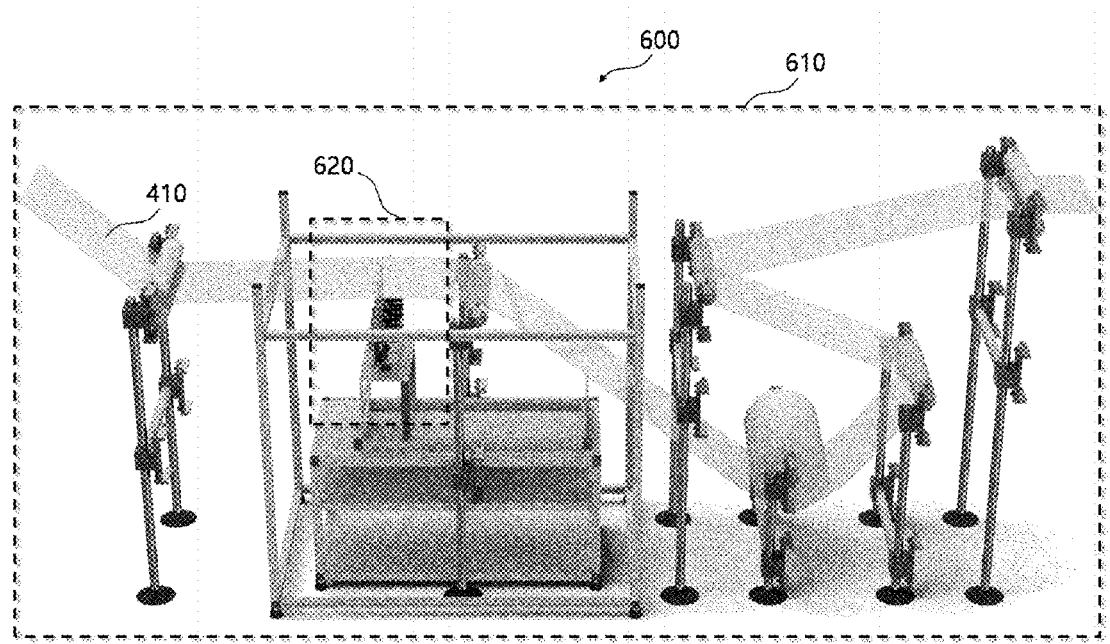

FIGS. 6 and 7 are views illustrating an example of an electrospinning alignment apparatus according to one embodiment of the present disclosure. The electrospinning alignment apparatus 600 according to this embodiment may include a carrier transfer portion for transferring a carrier 410, as shown in a first dotted box 610, and may include an electrospinning portion for fabricating a sub-micron fibrous membrane by spinning sub-micron fibers to the carrier 410 being transferred so as to coat sub-micron fibers onto an underside of the carrier 410, as shown in a second dotted box 620. In the embodiment of FIGS. 6 and 7, only one column of spinning nozzles is shown, but, as explained previously with reference to FIGS. 1 to 5, the electrospinning portion may virtually include a plurality of spinning nozzles 1 to 16 and guide portions and a stage portion 510 which are applied to at least some (e.g., the spinning nozzles 1 to 4 in the first row and the spinning nozzles 9 to 12 in the third row) of the plurality of spinning nozzles 1 to 16. In this instance, the carrier transfer portion may be implemented to transfer the carrier 410 in a roll-to-roll manner while it is being unwound from a roll, whereupon the carrier 410 may pass between the plurality of spinning nozzles 1 to 16 and the stage portion 510.

In more general terms, an electrospinning alignment apparatus according to an embodiment may include a plurality of first electrospinning portions to which a first voltage is applied, for aligning and spinning sub-micron fibers in a first horizontal direction, a plurality of second electrospinning portions to which the first voltage is applied, for randomly spinning sub-micron fibers, a stage portion to which a second voltage different than the first voltage is applied, spaced apart in a first vertical direction in which sub-micron fibers are spun from the plurality of electrospinning portions and the plurality of second electrospinning portions, and a carrier transfer portion for coating the sub-micron fibers spun from the plurality of first electrospinning portions and the plurality of second electrospinning portions onto the carrier by continuously passing the carrier between positions where the plurality of first electrospinning portions and the plurality of second electrospinning portions are disposed and a position where the stage portion is disposed.

In this instance, the plurality of first electrospinning portions may be spaced apart from each other in a second horizontal direction perpendicular to the first horizontal direction, and each of the plurality of first electrospinning portions may include a first spinning nozzle for spinning sub-micron fibers from a spinning solution and a guide portion that generates a force exerted on sub-micron fibers spun from a first spinning nozzle in the first horizontal direction by changing an electric field formed between the first spinning nozzle which spin sub-micron fibers from a spinning solution and the stage portion so that the sub-micron fibers spun from the first spinning nozzle are aligned in the first horizontal direction. For example, the plurality of first electrospinning portions may correspond to the spinning nozzles 1 to 4 in the first row and the spinning nozzles 9 to 12 in the third row to which the guide portion is applied.

Meanwhile, the guide portion may include a first guide body and a second guide body which are spaced apart from each other in the second horizontal direction perpendicular to the first horizontal direction, and the first spinning nozzle may be disposed under a space between the first guide body and the second guide body. For example, as described previously, the spinning nozzle 1 in the first row and the first column may be disposed under a space between the first guide body 210 and the second guide body 220.

Moreover, at least one of the first and second guide bodies included in one of the plurality of first electrospinning portions may be shared with another one of the plurality of first electrospinning portions. As described previously, FIG. 3 illustrates an example in which the spinning nozzle 1 in the first row and the first column and the spinning nozzle 2 in the first row and the second column share the second guide body 220.

In addition, as already described earlier, the first guide body and the second guide body may be individually formed of a material with a relative dielectric constant of 50 or lower.

Furthermore, the plurality of second electrospinning portions may be spaced apart from each other in the second horizontal direction perpendicular to the first horizontal direction, and each of the plurality of second electrospinning portions may include a second spinning nozzle for spinning sub-micron fibers from a spinning solution. For example, the plurality of second electrospinning portions may correspond to the spinning nozzles 5 to 8 in the second row and the spinning nozzles 13 to 16 in the fourth row to which the guide portion is not applied.

Such a plurality of first and second electrospinning portions will be described in more general terms. The plurality of first electrospinning portions each may be disposed by forming m first columns (m is a natural number) including n first spinning nozzles (n is a natural number), and the plurality of second electrospinning portions each may be disposed by forming i second columns (i is a natural number) including j second spinning nozzles (j is a natural number). The m first columns and the i second columns may be arranged in an alternating manner.

Here, the n and the j may be determined based on the width of the carrier in the second horizontal direction perpendicular to the first horizontal direction. In other words, the number of spinning nozzles included in one column may be determined based on the width of the carrier.

Moreover, the production of sub-micron fibers per unit of time may be adjusted by adjusting the m, i, and transfer rate of the carrier. For example, increases in m and i may mean an increase in the surface area of sub-micron fibers spun at a time. Accordingly, increasing the transfer rate of the carrier may increase the surface area of sub-micron fibers simultaneously coated onto the carrier, thereby increasing the production of sub-micron fibers per unit of time.

Meanwhile, sub-micron fibers may be spun in such a way that the diameter of sub-micron fibers spun from the plurality of first electrospinning portions is relatively larger than the diameter of sub-micron fibers spun from the plurality of second electrospinning portions. For example, the size of a space between sub-micron fibers coated onto the carrier may be adjusted by adjusting the difference between the diameter of sub-micron fibers spun from the plurality of first electrospinning portions and the diameter of sub-micron fibers spun form the plurality of second electrospinning portions.

Figure 8:
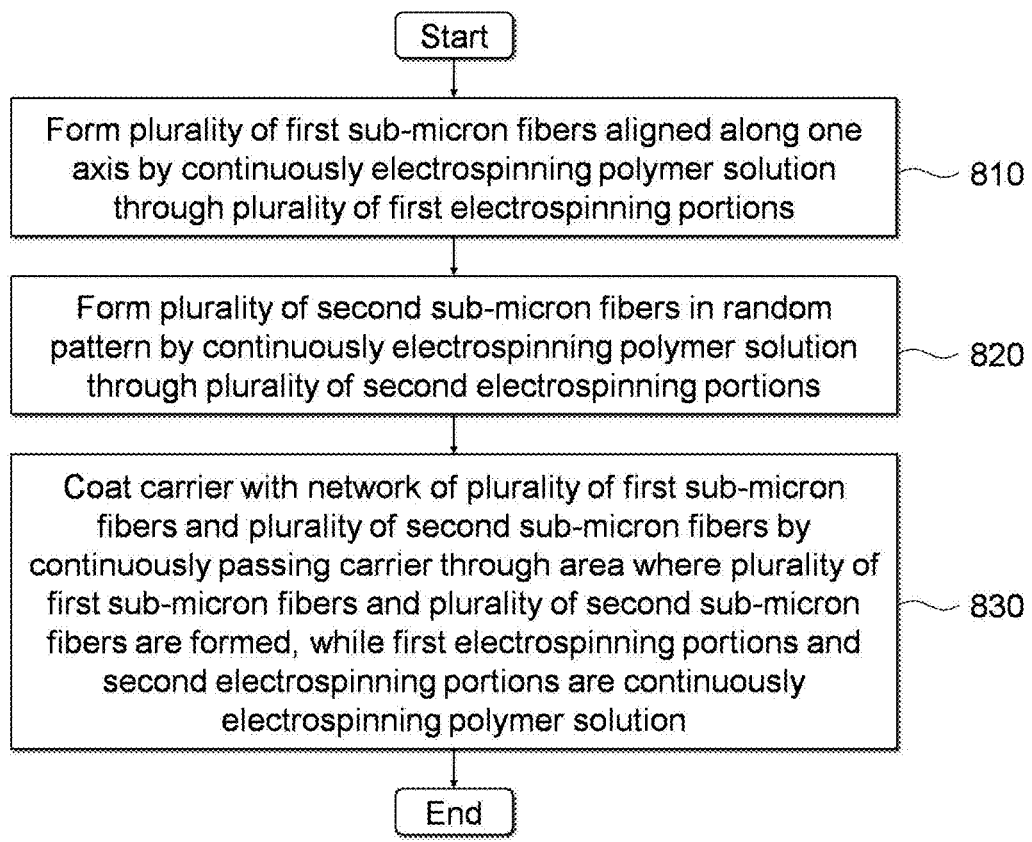
FIG. 8 is a flowchart illustrating an example of a method for producing a sub-micron fibrous membrane according to one embodiment of the present disclosure.

FIG. 8 is a flowchart illustrating an example of a method for producing a sub-micron fibrous membrane according to one embodiment of the present disclosure. The method for producing a sub-micron fibrous membrane according to the present embodiment may include: a step 810 of forming a plurality of first sub-micron fibers aligned along one axis by continuously electrospinning a polymer solution through a plurality of first electrospinning portions: a step 820 of forming a plurality of second sub-micron fibers in a random pattern by continuously electrospinning the polymer solution through a plurality of second electrospinning portions; and a step 830 of coating a carrier with a network of the plurality of first sub-micron fibers and the plurality of second sub-micron fibers by continuously passing the carrier through an area where the plurality of first sub-micron fibers and the plurality of second sub-micron fibers are formed, while the first electrospinning portions and the second electrospinning portions are continuously electrospinning the polymer solution. Accordingly, the carrier may be coated with a sub-micron fibrous membrane including a plurality of first sub-micron fibers spun in alignment along one axis and a plurality of second sub-micron fibers spun in a random pattern to form a network with the plurality of first sub-micron fibers.

In this instance, the plurality of first sub-micron fibers may be produced in such a way as to have a larger diameter than the plurality of second sub-micron fibers. In this case, the first sub-micron fibers having a larger diameter may be inserted between the second sub-micron fibers having a smaller diameter and serve as a spacer. Such a spacer may allow air to pass through easily by widening a space between web layers of the second sub-micron fibers. As an example, a mask using a sub-micron fibrous membrane according to the present embodiment as a filter offers an advantage of allowing the mask wearer to breathe more comfortably, since sub-micron fibers having a larger diameter serve as an ideal spacer to widen gaps between layers of sub-micron fibers of non-woven fabric which have smaller diameter. In this instance, the size of a space formed inside the sub-micron fibrous membrane may be adjusted by adjusting a difference between the diameter of the plurality of first sub-micron fibers and the diameter of the plurality of second sub-micron fibers. For example, the diameter of the plurality of first sub-micron fibers may be adjusted in the range of 300 nm to 2 μm, and the diameter of the plurality of second sub-micron fibers may be adjusted in the range of 50 nm to 300 nm.

As explained previously, in the step 810, the plurality of first sub-micron fibers may be formed through a plurality of first electrospinning portions to which a first voltage is applied, for aligning and spinning sub-micron fibers in a first horizontal direction. Also, in the step 820, the plurality of second sub-micron fibers may be formed through a plurality of second electrospinning portions to which the first voltage is applied, for randomly spinning sub-micron fibers.

Figure 9:
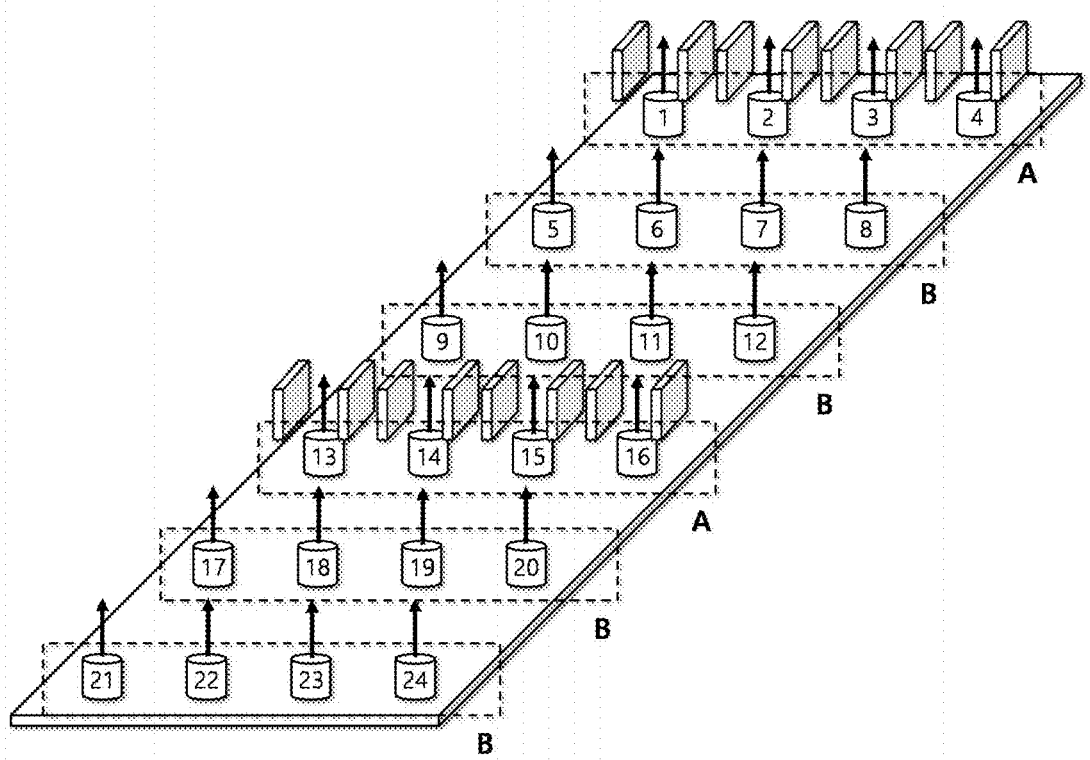
FIG. 9 is a view illustrating another example of a cross combination of columns of a plurality of first electrospinning portions and columns of a plurality of second electrospinning portions according to one embodiment of the present disclosure.

FIG. 9 is a view illustrating another example of a cross combination of columns of a plurality of first electrospinning portions and columns of a plurality of second electrospinning portions according to one embodiment of the present disclosure. The foregoing FIGS. 1 to 5 depict an example in which a plurality of first electrospinning portions form two columns (hereinafter, A lines) and a plurality of second electrospinning portions form two columns (hereinafter, B lines) and they are cross-combined in the order "A-B-A-B". On the other hand, in another embodiment, FIG. 9 depicts an example in which they are cross-combined in the order "A-B-B-A-B-B". More specifically, out of the plurality of spinning nozzles 1 to 24 illustrated in FIG. 9, the spinning nozzles 1 to 4 form a first A line, the spinning nozzles 13 to 16 form a second A line, and the spinning nozzles 5 to 8, the spinning nozzles 9 to 12, the spinning nozzles 17 to 20, and the spinning nozzles 21 to 24 form four B lines, respectively. As such, a more variety of cross combinations may be made out of a plurality of first electrospinning portions and a plurality of second electrospinning portions.

In this instance, as a random layer formed through the B lines (i.e., columns of second electrospinning portions which randomly spun second sub-micron fibers) thickens and accumulates more and more, the filter efficiency may be increased. Accordingly, the filter efficiency may be made to fit the standards for KF94 (a filter efficiency of 94% or higher with an average particle size of 400 nm for NaCl and paraffin oil particles) or for KF80 (a filter efficiency of 80% or higher with an average particle size of 600 nm for NaCl particles).

Meanwhile, in some embodiments, a polymer material forming the plurality of first sub-micron fibers and a polymer material forming the plurality of second sub-micron fibers may be identical or different.

For example, in the embodiment of FIG. 9, the polymer material of second sub-micron fibers formed through the B lines may be any polymer that can be spun by being dissolved in a polar solvent, and any polymer may be used as long as it has excellent mechanical and thermal durability which does not melt or break down in structure even if it is thermally treated for at least 12 hours at 100° C. for removal of residual solvent. Also, two or more types of polymers with different molecular weights may be blended. For example, a polymer forming the second sub-micron fibers may include one or a combination of the following polymers: polyacrylonitrile, polyvinylidene fluoride-hexafluoropropylene (PVDF-HFP), polymethylmethacrylate (PMMA), polyurethane, polysulfones (polysulfone, polyethersulfone, and polyphenylene sulfone), polyvinyl acetate (PVAc), polyacrylic acid (PAA), polyvinyl alcohol (PVA), polyvinylidene fluoride (PVDF), polyimide (PI), and polystyrene (PS). The diameter of the polymer forming the second sub-micron fibers may be included in the range of 50 nm to 300 nm.

Meanwhile, the polymer material of the first sub-micron fibers formed through the A lines may be identical to the polymer material of the second sub-micron fibers formed through the B lines, or may be a different polymer material from the polymer material of the second sub-micron fibers, selected from the above set of polymers (hereinafter, a general polymer group). The diameter of the polymer forming the first sub-micron fibers may be included in the range of 50 nm to 300 nm.

Moreover, in some embodiments, biodegradable polymer may be used. For example, the polymer material of the second sub-micron fibers formed through the B lines may include one biodegradable polymer or a combination of two or more biodegradable polymers of the following: polylactic acid (PLA), poly(lactic-co-glycolic acid) (PLGA), and chitosan. In this case, the polymer material of the first sub-micron fibers formed through the A lines may be selected from the above general polymer group or selected from the above set of degradable polymers (hereinafter, a biodegradable polymer group). The diameter of the first sub-micron fibers may be larger than the diameter of the second sub-micron fibers regardless of whether the polymer material of the first sub-micron fibers and the polymer material of the second sub-micron fibers are identical or different.

Embodiment 1: Manufacture of PAN Sub-Micron Fibrous Filter with Different Average Diameters In the present embodiment, polyacrylonitrile (PAN) having a molecular weight of 150,000 was dissolved in an N,N-dimethylformamide (DMF) solvent at concentrations of 15 wt % and 9 wt %. Test equipment was installed in such a way that the dissolved, 15 wt % PAN solution was fed at an injection flow rate of 7 μl/min into electrospinning nozzles (21 G, outer diameter of 0.82 mm) with insulating blocks (the above-described guide portions) mounted thereon, and that the 9 wt % PAN solution was fed at an injection flow rate of 3 μl/min into electrospinning nozzles (24 G, outer diameter of 0.5 mm) with no insulation blocks. A sub-micron fibrous membrane with a fiber diameter of 100 to 500 nm was produced by keeping a distance of 5 to 10 cm between electrospinning portions and a collector for collecting sub-micron fibers and adjusting the applied voltage from 6 to 12 kV. A non-woven fabric membrane such as polypropylene (PP) or polyethylene terephthalate (PET) may be used as a substrate where sub-micron fibers are held, and the sub-micron fibers may be collected directly on a non-woven fabric, and then another non-woven fabric may be piled on the sandwiched sub-micron fibers, thereby forming a filter.

Figure 10:
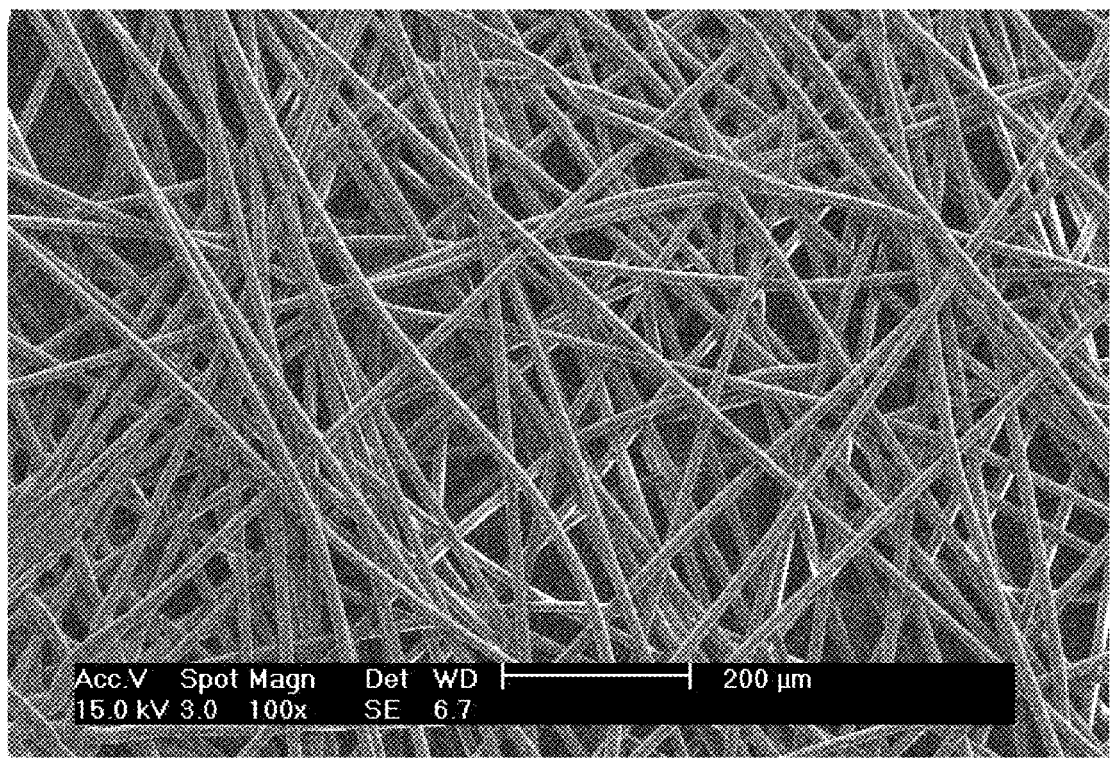
FIG. 10 is a scanning electron microscope (SEM) photograph of a PET non-woven fabric having an average diameter of 15 μm according to one embodiment of the present disclosure.
Figure 11:
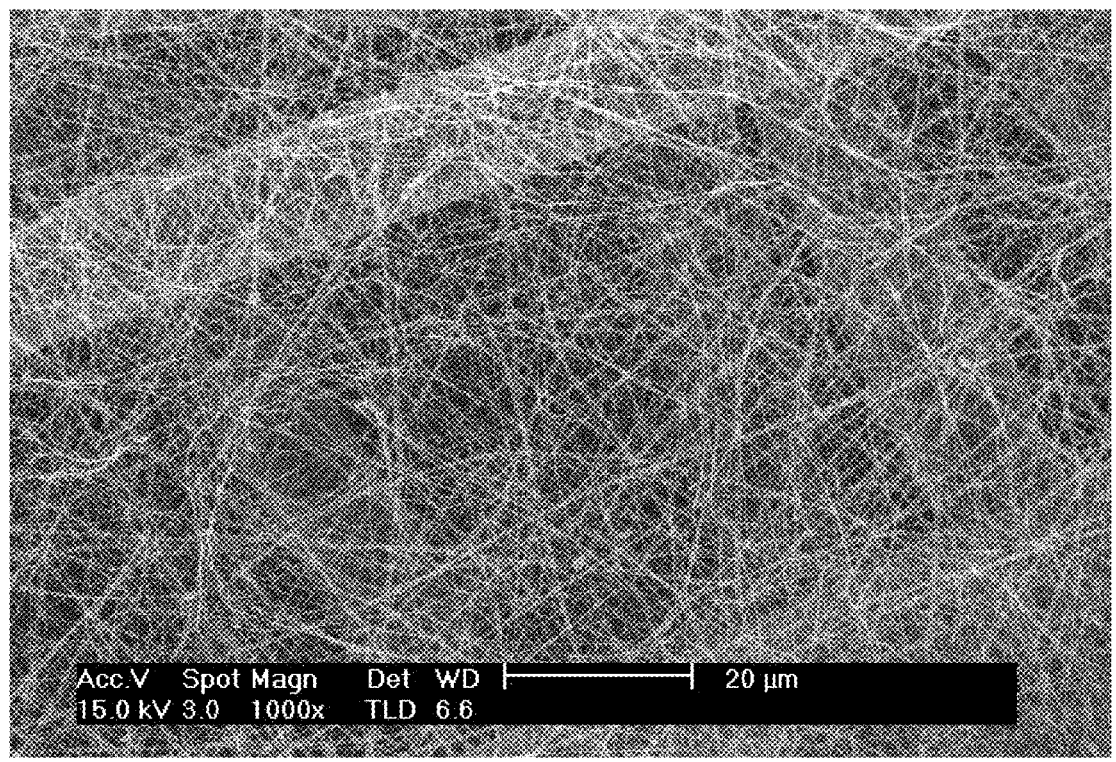
FIGS. 11 to 13 are scanning electron microscope (SEM) photographs of sub-micron fibers built up on a PET non-woven fabric according to one embodiment of the present disclosure.
Figure 12:
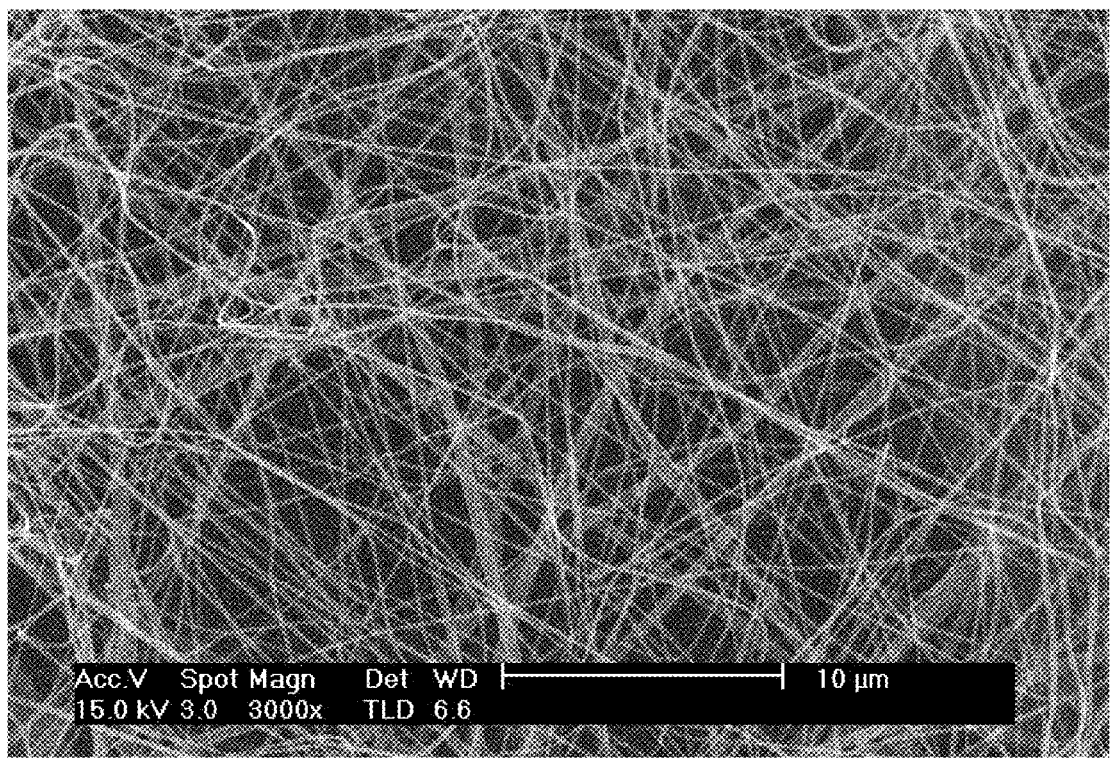
Figure 13:
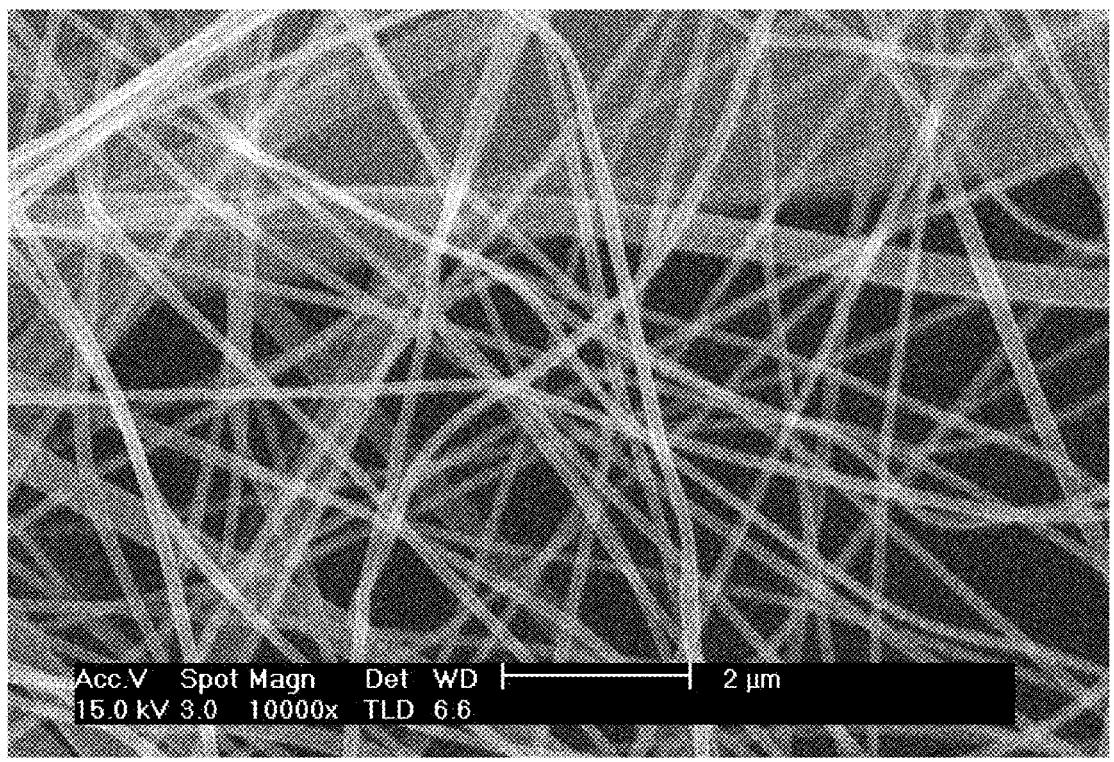

FIG. 10 is a scanning electron microscope (SEM) photograph of a PET non-woven fabric having an average diameter of 15 μm according to one embodiment of the present disclosure. FIGS. 11 to 13 are scanning electron microscope (SEM) photographs of sub-micron fibers built up on a PET non-woven fabric according to one embodiment of the present disclosure. FIG. 11 shows a network that is formed on a PET non-woven fabric by blending first sub-micron fibers with a large diameter that are drawn along one axis using insulating blocks and second sub-micron fibers with a smaller diameter that are randomly collected. Also, FIGS. 12 and 13 depict an enlarged micro-structure of the photograph of FIG. 11.

Figure 14:
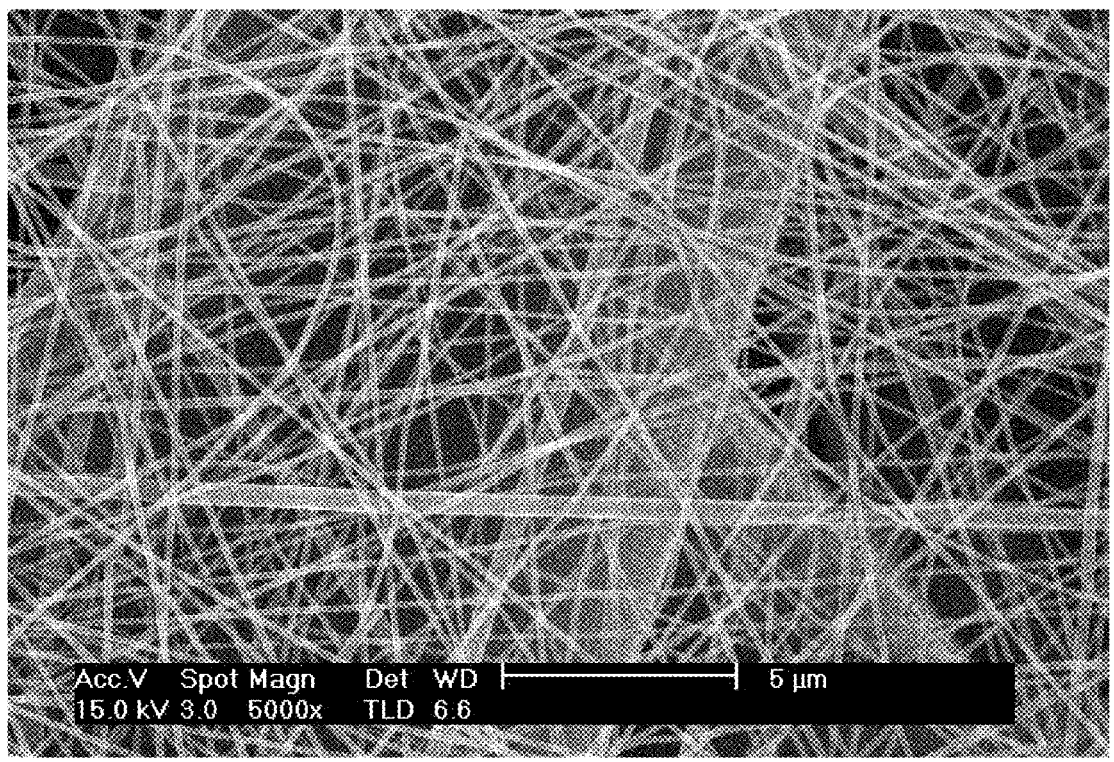
FIG. 14 is a scanning electron microscope (SEM) photograph of a sub-micron fibrous membrane according to one embodiment of the present disclosure.

FIG. 14 is a scanning electron microscope (SEM) photograph of a sub-micron fibrous membrane according to one embodiment of the present disclosure. FIG. 14 depicts a filter composed of sub-micron fibrous membranes having different average diameter distributions, in which the diameter of first sub-micron fibers is included in the range of 400 to 500 nm and the diameter of second sub-micron fibers is included in the range of 100 to 200 nm. Typical nanofiber-based masks are disadvantageous in that its breathing resistance is high for the same filter efficiency because it has a single diameter and the orientation of fibers is not adjusted. On the other hand, the sub-micron fibrous membrane according to the present embodiment may serve to widen a space between filter layers of small diameters, since the first sub-micron fibers having a larger diameter are positioned between the second sub-micron fibers having a smaller diameter. This decreases breathing resistance and makes breathing easier, thereby providing a solution to problems with typical nanofiber-based masks.

Embodiment 2: Ethanol Disinfection

Sub-micron fibrous membranes according to embodiments of the present disclosure may act as a physical filter. Accordingly, disinfection may be performed by spraying ethanol or soaking the filter in ethanol. In Embodiment 2, a triple-layer filter of PET-sub-micron fibers-PET was soaked in an ethanol solution for 1 hour and microstructural changes were observed. For proper disinfection, the ethanol content was kept at 60 to 70%, and the ethanol was mixed with water.

Figure 15:
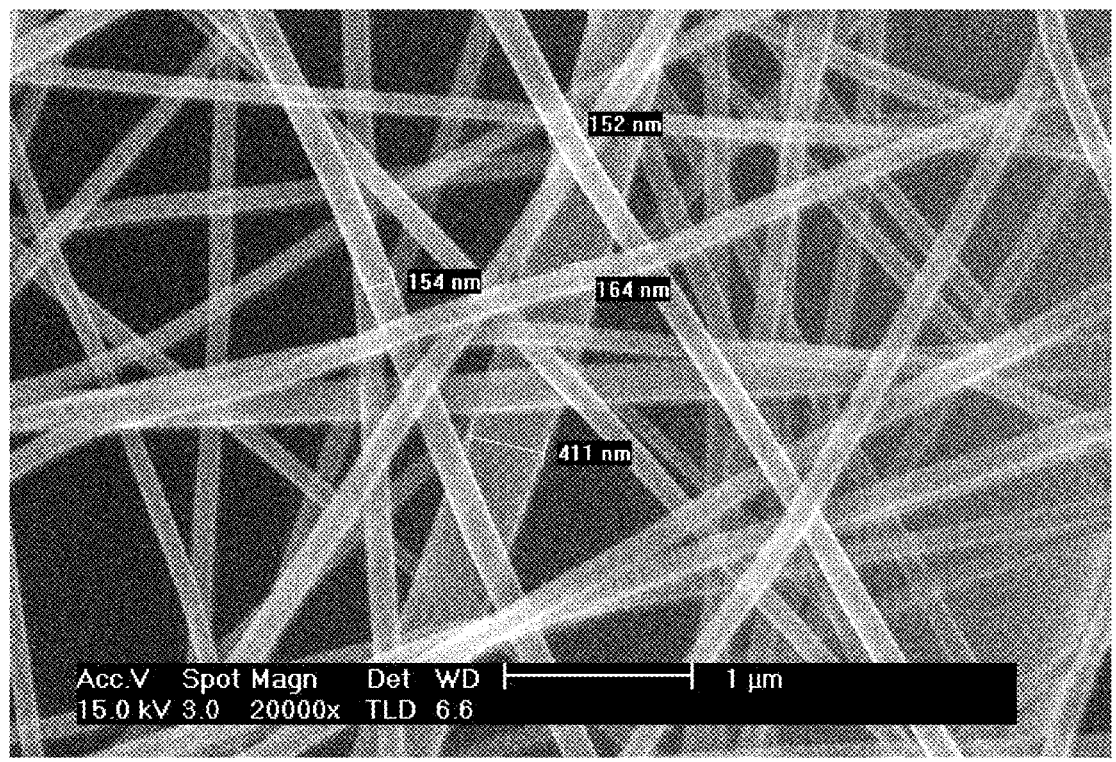
FIG. 15 is an image of a sub-micron fibrous membrane's microstructure obtained after 1 hour of ethanol treatment according to one embodiment of the present disclosure.

FIG. 14 is a scanning electron microscope (SEM) photograph of a sub-micron fibrous membrane after ethanol treatment according to one embodiment of the present disclosure. FIG. 15 is an image of a sub-micron fibrous membrane's microstructure obtained after 1 hour of ethanol treatment according to one embodiment of the present disclosure. The figures show that no change was observed in fiber form even after the ethanol treatment, and that PAN sub-micron fibers were highly stable in ethanol. Also, as shown in the image of FIG. 15, the first sub-micron fibers had a diameter of 411 nm even after the 1 hour of ethanol treatment, whereas the second sub-micron fibers had an average distribution of 150 nm to 160 nm.

Performance Assessment

To measure the filtration efficiency of a sandwich-type air filter of non-woven fabric, submicron fibers, and non-woven fabric which was manufactured according to Embodiment 1, a dioctyl sebacate oil solution, an aerosol generator (TSI 3079A) for generating particles, and a particle counter (TSI 3330) for counting the number of particles of each size were used, and performance assessment was performed with a face velocity of 5.3 cm/s at a rate of 32 liters per minute. Afterwards, numerical data was obtained by taking an average from measurements of a number of samples manufactured under the same condition.

Figure 16:
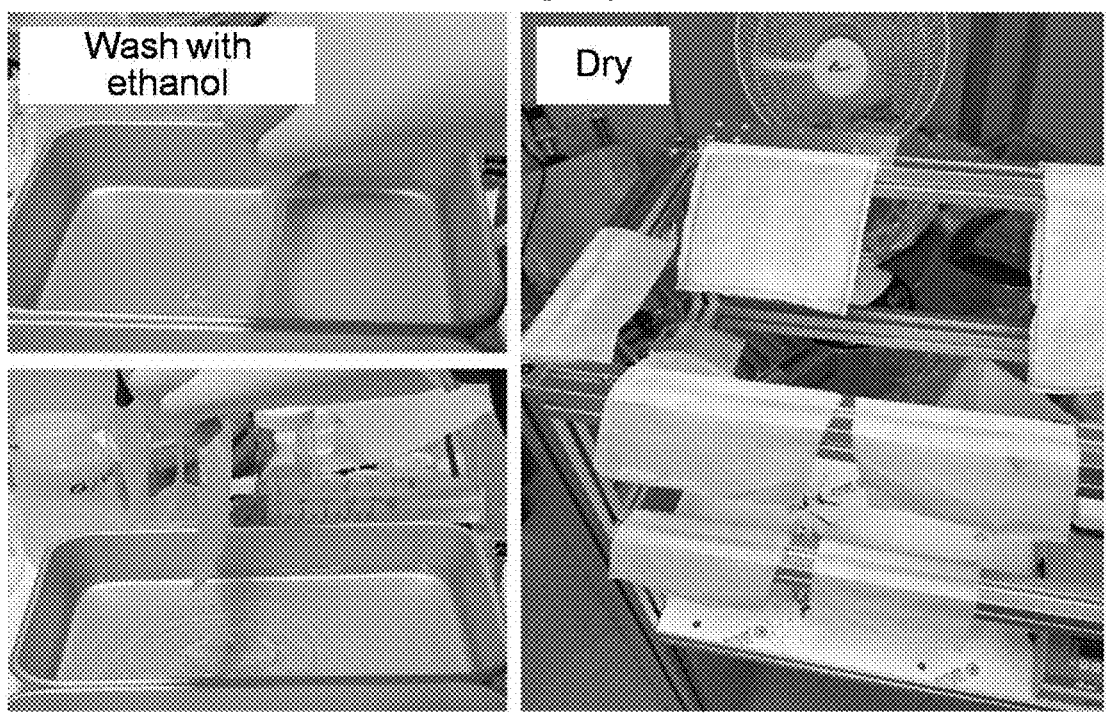
FIG. 16 is an image showing a process in which an air filter is disinfected with ethanol and dried, according to one embodiment of the present disclosure.

FIG. 16 is an image showing a process in which an air filter is disinfected with ethanol and dried, according to one embodiment of the present disclosure. For disinfection of a sub-micron fiber-based filter manufactured according to Embodiment 1, the filter was sprayed with ethanol by an atomizer and then dried, or the filter was soaked in a container containing ethanol and then taken out, followed by assessment.

Figure 17:
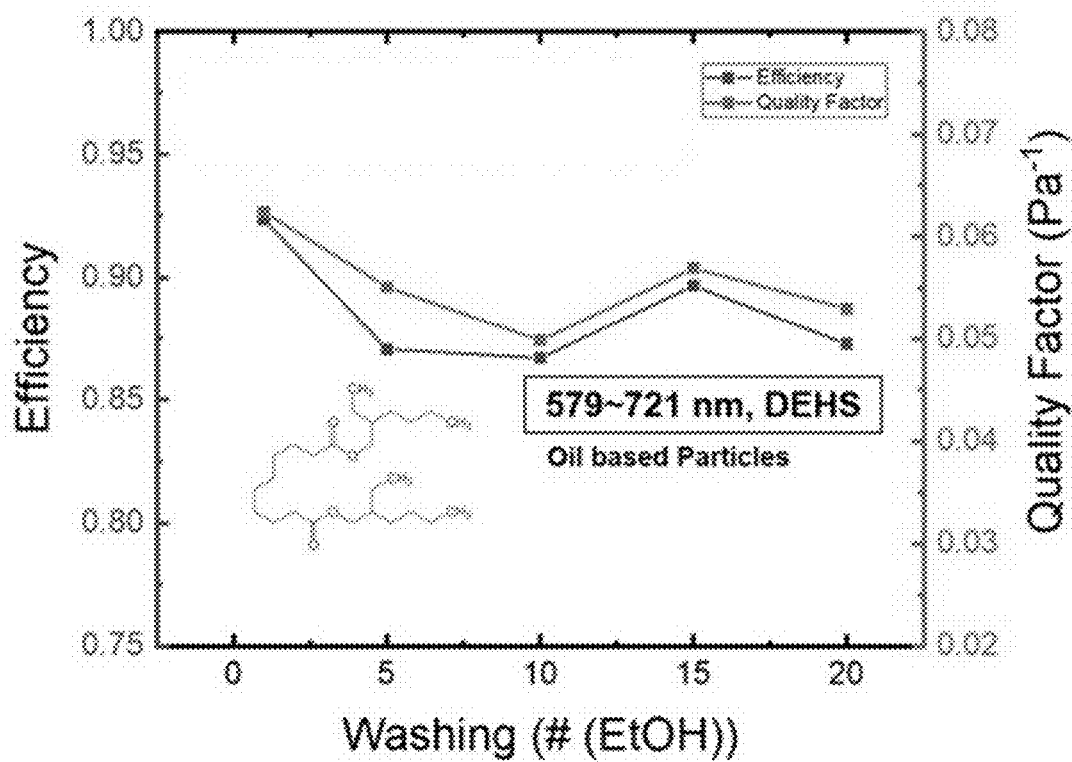
FIG. 17 is a graph showing the performance of an air filter according to one embodiment of the present disclosure.

FIG. 17 is a graph showing the performance of an air filter according to one embodiment of the present disclosure. The graph of FIG. 17 is a performance graph obtained after the air filter was washed with ethanol, in which the X axis represents the number of times the air filter is washed with ethanol, the Y axis on the left represents filtration efficiency (particle size ranges from 579 to 721 nm), and the Y axis on the right represents quality factor (QF=−ln(1−efficiency)/Pa). According to this performance graph, the filtration efficiency of the sub-micron fiber filter washed with ethanol once was 92% and its quality factor was 0.062, whereas a sample washed with ethanol 20 times showed a filtration efficiency of 87% and a quality factor of 0.053. Table 1 below shows filter performance data with respect to the number of times of washing with ethanol.

TABLE 1

| | Particle size of 579 to 721 nm | | | | |
|---|---|---|---|---|---|
| | Washed with ethanol once | Washed with ethanol 5 times | Washed with ethanol 10 times | Washed with ethanol 15 times | Washed with ethanol 20 times |
| Filtration efficiency | 92% | 87% | 86% | 89% | 87% |
| Quality factor | 0.062 | 0.055 | 0/050 | 0.057 | 0.053 |

Figure 18:
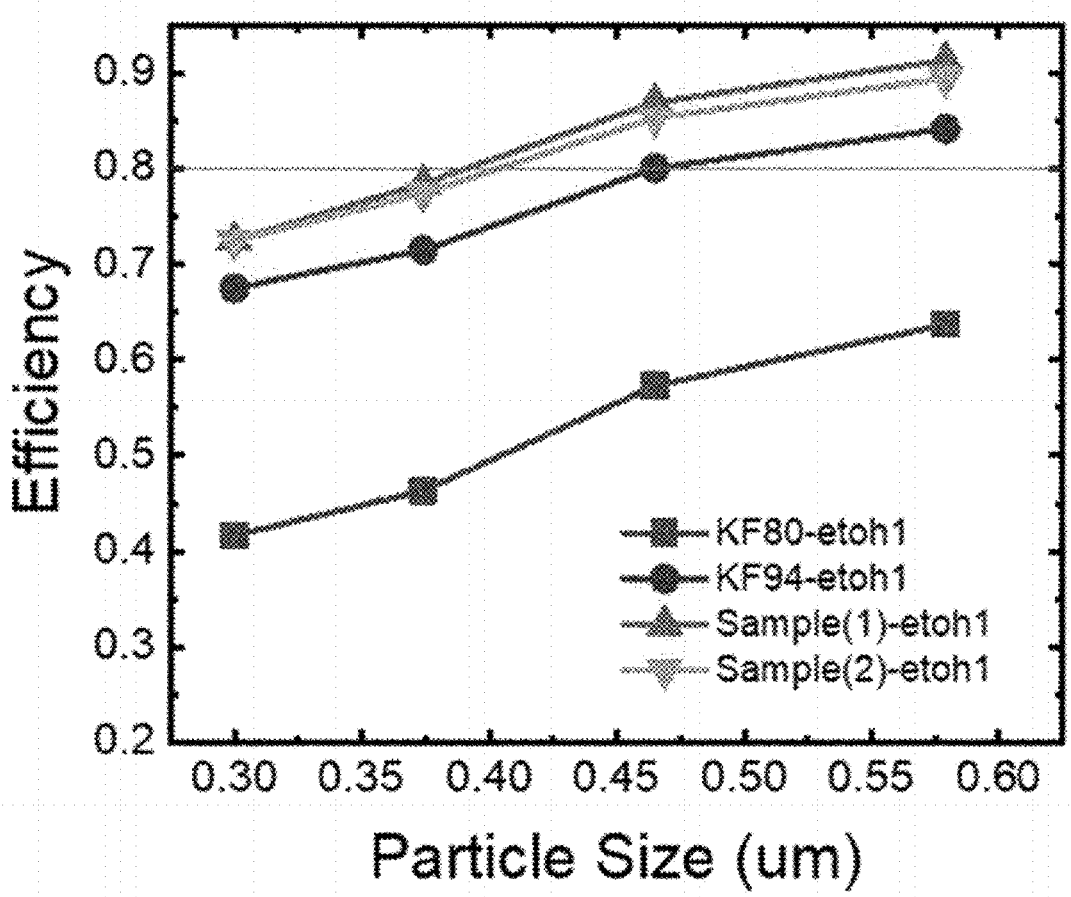
FIGS. 18 and 19 are graphs showing a comparison of filter performance when filters are disinfected with ethanol, according to one embodiment of the present disclosure.
Figure 19:
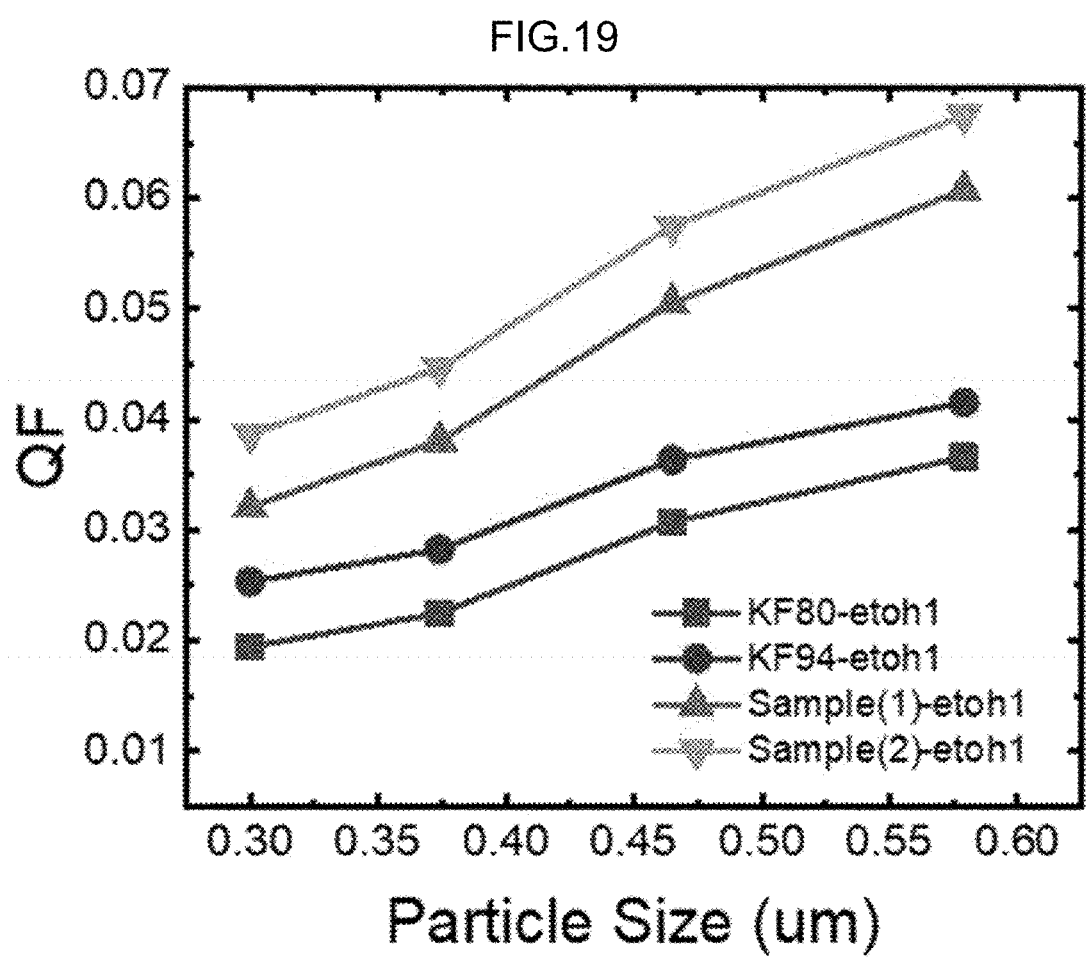

FIGS. 18 and 19 are graphs showing a comparison of filter performance when filters are disinfected with ethanol, according to one embodiment of the present disclosure. FIGS. 18 and 19 are graphs showing a performance comparison between a conventional air filter (electrostatic MB filter) which is manufactured by applying static electricity onto a melt-brown non-woven fabric filtering medium and a sub-micron fiber-based air filter manufactured according to embodiments of the present disclosure. The X axis represents the size of particles used for filtration efficiency measurement, the Y axis in the graph of FIG. 18 represents filtration efficiency, and the Y axis in the graph of FIG. 19 represents quality factor. KF80 indicated in the graphs of FIGS. 18 and 19 means an electrostatic MB filter applied to the KF80 grade for hygienic masks, and KF94 means an electrostatic MB filter applied to the KF94 grade for hygienic masks. Also, the samples indicated in the graphs mean a sub-micron fiber-based air filter. That is, the Sample (1) is a filter composed only of sub-micron fibers having a diameter of about 400 nm, and the Sample (2) is a filter composed of a combination of sub-micron fibers having a diameter of about 400 nm and a diameter of about 200 nm. According to the graphs of FIGS. 18 and 19, the electrostatic MB filters for collecting particles through an electrostatic attractive force showed a significantly lower efficiency because static electricity was lost due to ethanol. KF94 is required to meet 94% or higher filtration efficiency for particles with an average size of 400 nm, and KF80 is required to meet 80% or higher filtration efficiency for particles with an average size of 600 nm. In a comparison of quality factor which compares the performance of the air filters using objective numerical values, it was found out that the performance of the sub-micron fiber-based air filter was higher compared to the electrostatic MB filter washed with ethanol. Also, the Sample (2) showed a higher quality factor than the Sample (1), and accordingly, it can be found out that the sub-micron fiber-based air filter composed of fibers with difference of more than twice diameters has better performance than the sub-micron fibers having a single diameter.

Figure 20:
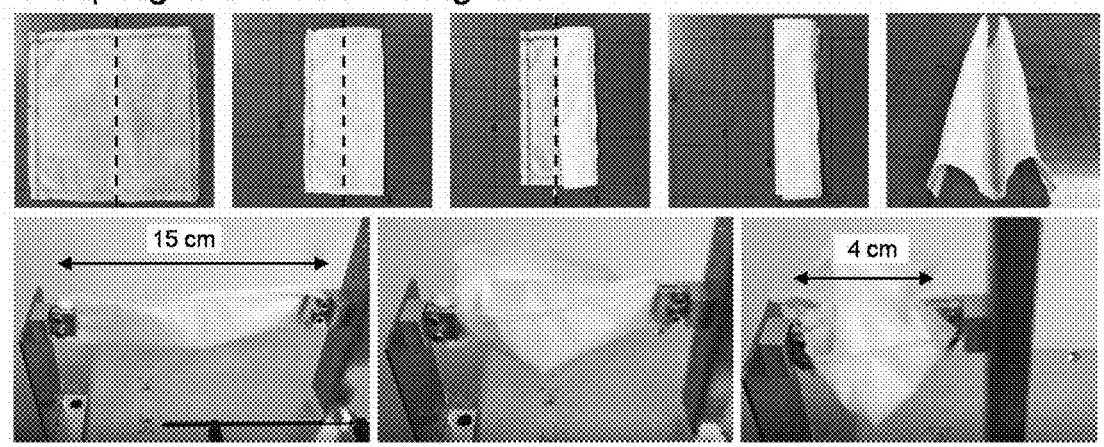
FIG. 20 shows images of an example of a process of conducting a bending test on an air filter according to one embodiment of the present disclosure.

FIG. 20 shows images of an example of a process of conducting a bending test on an air filter according to one embodiment of the present disclosure. FIG. 21 shows result images of a bending test conducted on an air filter according to one embodiment of the present. FIG. 22 is a graph showing the efficiency of an air filter according to one embodiment of the present disclosure.

FIG. 20 shows a process in which a bending test is repeatedly performed by folding an air filter containing sub-micron filters in three in order to test mechanical durability. The repeated bending test was performed by cutting a filter of 15 cm×15 cm and then reducing the length from 15 cm to 4 cm and extending it back.

The images of FIG. 21 show that there was no change in the outward appearance of an air filter containing sub-micron fibers even after a bending test was conducted on the filter 1,000 times and 2,000 times, respectively, and that the microstructure of the sub-micron fibers was maintained well without change in it.

The graph of FIG. 22 showed filter efficiency measurements obtained after a bending test was performed 2,000 times and 4,000 times, respectively. For 600 nm particles, it was observed that the filter efficiency was kept at 92.45% after the bending test was performed 2,000 times, and the filter efficiency was kept at 83.99% after the bending test was performed 4,000 times, thereby achieving a filtration efficiency well over KF80.

From this, according to embodiments of the present disclosure, it is possible to mass-produce a sub-micron fibrous membrane by simultaneously spinning sub-micron fibers aligned along one axis on a carrier being transferred and sub-micron fibers that are randomly spun. Furthermore, a mask using a sub-micron fibrous membrane as a filter lets air through easily and allows the user to breathe more comfortably, since the size of a space formed inside a produced sub-micron fibrous membrane is adjusted by adjusting a difference between the diameter of sub-micron fibers spun in alignment along one axis and the diameter of randomly spun sub-micron fibers. Furthermore, the use of biodegradable polymers can reduce environmental contamination.

[Mode for Disclosure]

As described above, although the embodiments have been described in connection with the limited embodiments and the drawings, those skilled in the art may modify and change the embodiments in various ways from the description. For example, the relevant results may be achieved even when the described technologies are performed in a different order than the described methods, and/or even when the described components such as systems, structures, devices, and circuits are coupled or combined in a different form than the described methods or are replaced or substituted by other components or equivalents.

Therefore, other implementations, other embodiments, and equivalents to the claims are also within the scope of the following claims.

The invention claimed is:

1. A sub-micron fibrous membrane comprising:
   a plurality of first sub-micron fibers spun in alignment along a first horizontal direction; and
   a plurality of second sub-micron fibers spun in a random pattern to form a network with the plurality of first sub-micron fibers,
   wherein the plurality of first sub-micron fibers is formed through a plurality of first electrospinning portions to which a first voltage is applied, for aligning and spinning sub-micron fibers in the first horizontal direction, and the plurality of second sub-micron fibers is formed through a plurality of second electrospinning portions to which the first voltage is applied, for randomly spinning sub-micron fibers.

2. The sub-micron fibrous membrane of claim 1, wherein the diameter of the plurality of first sub-micron fibers is larger than the diameter of the plurality of second sub-micron fibers.

3. The sub-micron fibrous membrane of claim 1, wherein the diameter of the plurality of first sub-micron fibers is included in the range of 300 nm to 2 µm, and the diameter of the plurality of second sub-micron fibers is included in the range of 50 nm to 300 nm.

4. The sub-micron fibrous membrane of claim 1, wherein the size of a space formed inside the sub-micron fibrous membrane is adjusted by adjusting a difference between the diameter of the plurality of first sub-micron fibers and the diameter of the plurality of second sub-micron fibers.

5. The sub-micron fibrous membrane of claim 1, wherein a polymer material forming the plurality of first sub-micron fibers and a polymer material forming the plurality of second sub-micron fibers are different.

6. The sub-micron fibrous membrane of claim 1, wherein a polymer forming the plurality of first sub-micron fibers and the plurality of second sub-micron fibers includes one or a combination of the following polymers: polyacrylonitrile, polyvinylidene fluoride-hexafluoropropylene (PVDF-HFP), polymethylmethacrylate (PMMA), polyurethane, polysulfones (polysulfone, polyethersulfone, and polyphenylene sulfone), polyvinyl acetate (PVAc), polyacrylic acid (PAA), polyvinyl alcohol (PVA), polyvinylidene fluoride (PVDF), polyimide (PI), and polystyrene (PS).

7. The sub-micron fibrous membrane of claim 1, wherein a polymer forming the plurality of first sub-micron fibers includes one or a combination of the following polymers: polyacrylonitrile, polyvinylidene fluoride-hexafluoropropylene (PVDF-HFP), polymethylmethacrylate (PMMA), polyurethane, polysulfones (polysulfone, polyethersulfone, and polyphenylene sulfone), polyvinyl acetate (PVAc), polyacrylic acid (PAA), polyvinyl alcohol (PVA), polyvinylidene fluoride (PVDF), polyimide (PI), and polystyrene (PS), and a polymer forming the plurality of second sub-micron fibers includes one biodegradable polymer or a combination of two or more biodegradable polymers of the following: polylactic acid (PLA), poly(lactic-co-glycolic acid) (PLGA), and chitosan.

8. The sub-micron fibrous membrane of claim 1, wherein the plurality of first electrospinning portions each is disposed by forming m first columns including n first spinning nozzles, the plurality of second electrospinning portions each is disposed by forming i second columns including j second spinning nozzles, and at least one of the i second columns is disposed between at least two of the m first columns, wherein n, m, j, and i are natural numbers.

9. The sub-micron fibrous membrane of claim 1, wherein the plurality of first sub-micron fibers is spun in alignment along the first horizontal direction by a force exerted in the first horizontal direction, which is generated by a guide portion included in each of the plurality of first electrospinning portions,
   wherein the guide portion included in each of the plurality of first electrospinning portions generates the force exerted on sub-micron fibers spun from a respective first spinning nozzle of each of the plurality of first electrospinning portions in the first horizontal direction by changing an electric field formed between the first spinning nozzle which spins sub-micron fibers from a spinning solution and a stage portion to which a second voltage different than the first voltage is applied.

10. The sub-micron fibrous membrane of claim 9, wherein the guide portion includes a first guide body and a second guide body which are spaced apart from each other in a second horizontal direction perpendicular to the first horizontal direction, and the first spinning nozzle is disposed under a space between the first guide body and the second guide body.

11. A mask with a sub-micron fibrous membrane included in a filter,
    wherein the sub-micron fibrous membrane comprises
    a plurality of first sub-micron fibers spun in alignment along a first horizontal direction; and
    a plurality of second sub-micron fibers spun in a random pattern to form a network with the plurality of first sub-micron fibers.

12. A method for producing a sub-micron fibrous membrane, the method comprising:
    forming a plurality of first sub-micron fibers aligned along a first horizontal direction by continuously electrospinning a polymer solution through a plurality of first electrospinning portions;
    forming a plurality of second sub-micron fibers in a random pattern by continuously electrospinning the polymer solution through a plurality of second electrospinning portions; and
    coating a carrier with a network of the plurality of first sub-micron fibers and the plurality of second sub-micron fibers by continuously passing the carrier through an area where the plurality of first sub-micron fibers and the plurality of second sub-micron fibers are formed, while the first electrospinning portions and the second electrospinning portions are continuously electrospinning the polymer solution.

13. The method of claim 12, wherein the diameter of the plurality of first sub-micron fibers is larger than the diameter of the plurality of second sub-micron fibers.

14. The method of claim 12, wherein the diameter of the plurality of first sub-micron fibers is included in the range of 300 nm to 2 µm, and the diameter of the plurality of second sub-micron fibers is included in the range of 50 nm to 300 nm.

15. The method of claim 12, wherein the size of a space formed inside the sub-micron fibrous membrane is adjusted by adjusting a difference between the diameter of the plurality of first sub-micron fibers and the diameter of the plurality of second sub-micron fibers.

16. The method of claim 12, wherein a polymer material forming the plurality of first sub-micron fibers and a polymer material forming the plurality of second sub-micron fibers are different.

17. The method of claim 12, wherein a polymer forming the plurality of first sub-micron fibers and the plurality of second sub-micron fibers includes one or a combination of the following polymers: polyacrylonitrile, polyvinylidene fluoride-hexafluoropropylene (PVDF-HFP), polymethylmethacrylate (PMMA), polyurethane, polysulfones (polysulfone, polyethersulfone, and polyphenylene sulfone), polyvinyl acetate (PVAc), polyacrylic acid (PAA), polyvinyl alcohol (PVA), polyvinylidene fluoride (PVDF), polyimide (PI), and polystyrene (PS).

18. The method of claim 12, wherein a polymer forming the plurality of first sub-micron fibers includes one or a combination of the following polymers: polyacrylonitrile, polyvinylidene fluoride-hexafluoropropylene (PVDF-HFP), polymethylmethacrylate (PMMA), polyurethane, polysulfones (polysulfone, polyethersulfone, and polyphenylene sulfone), polyvinyl acetate (PVAc), polyacrylic acid (PAA), polyvinyl alcohol (PVA), polyvinylidene fluoride (PVDF), polyimide (PI), and polystyrene (PS), and a polymer forming the plurality of second sub-micron fibers includes one biodegradable polymer or a combination of two or more biodegradable polymers of the following: polylactic acid (PLA), poly(lactic-co-glycolic acid) (PLGA), and chitosan.

19. The method of claim 12, wherein the plurality of first electrospinning portions each is disposed by forming m first columns including n first spinning nozzles, the plurality of second electrospinning portions each is disposed by forming i second columns including j second spinning nozzles, and at least one of the i second columns is disposed between at least two of the m first columns, wherein n, m, j, and i are natural numbers.

* * * * *